March 16, 1965     J. N. MIALE ETAL     3,173,855

CATALYTIC CONVERSION WITH ACTIVATED CATALYST

Filed Dec. 29, 1961

INVENTORS
Paul B. Weisz &
Joseph N. Miale.

ATTORNEY.

United States Patent Office 3,173,855
Patented Mar. 16, 1965

3,173,855
CATALYTIC CONVERSION WITH ACTIVATED
CATALYST
Joseph N. Miale, Runnemede, N.J., and Paul B. Weisz,
Media, Pa., assignors to Socony Mobil Oil Company,
Inc., a corporation of New York
Filed Dec. 29, 1961, Ser. No. 163,132
20 Claims. (Cl. 208—120)

This invention relates to a process for catalytically transforming certain classes of organic compounds in the presence of a unique catalyst, the activity of which is unexpectedly enhanced or promoted upon contact with an acidic gas having a dissociation constant, expressed as the negative logarithm of the first dissociation equilibrium constant, i.e. —log $K$, of greater than 6 but less than 10. More particularly, the present invention is concerned with a method wherein an organic charge undergoes catalytic conversion in the presence of an acidic gas of the aforesaid type and a catalyst consisting essentially of specified crystalline metal aluminosilicate salts.

It has heretofore been reported that various chemical reactions may be advantageously carried out by contact catalysis utilizing as catalysts, crystalline metal aluminosilicate zeolites having rigid three-dimensional networks made up of unit cells characterized by the substantial absence of change in unit cell dimension upon dehydration and rehydration and a homogeneous highly uniform pore structure. The above requirements are fulfilled by certain crystalline zeolites known as molecular sieves. The reactions effectively catalyzed by such materials include, by way of example, hydrocarbon cracking, alkylation, dealkylation, disproportionation, isomerization, and polymerization.

The ability of the above catalysts to influence and direct the course of chemical conversions entails an unusual degree of desirable catalytic selectivity. Briefly, two types of selectivity are involved; first geometrical selectivity, which depends on the relationship between the diameter of the pores in the crystal structure of the aluminosilicate zeolite and the diameter of the reactant and product molecules, and second, intrinsic catalytic selectivity, which depends on the choice of cations present on the internal surface of the crystalline metal aluminosilicate salt.

In accordance with the present invention, it has now been discovered that the catalytic characteristics of the above-indicated crystalline aluminosilicate salts are enhanced and advantageously promoted when catalytic transformation is carried out in the presence of such materials, which have undergone contact prior to completion of the desired transformation with a particularly specified acidic gas. Thus, it has been found that treatment of the crystalline metal aluminosilicate catalyst with the acidic gas may be carried out as a pretreating step or alternatively that the acidic gas may be introduced into the reaction zone simultaneously with the charge stock or subsequent to introduction of the charge stock but prior to completion of the desired catalytic transformation. Thus, it has been found that the presence in the reaction zone of an acidic gas of the type specified, increases the rate of a catalytic conversion reaction, such as paraffin cracking, with certain crystalline metal aluminosilicates under conditions for which catalytic activity already exists. In addition, it has been found, by pretreating with the specified acidic gas, that a crystalline metal aluminosilicate which normally possesses little or no catalytic activity by reason of its being non-porous to the components of the reaction charge, is rendered catalytically active. Likewise, it has been found, by introducing such acidic gas into a reaction zone containing a small pore size crystalline metal aluminosilicate normally inactive in conversion of the charge stock due to the inability of the charge components to enter the pores of aluminosilicate, that such metal aluminosilicate is catalytically activated. Thus, with the present invention, it has been discovered that the presence of a readily available acidic gas adjuvant, for example, hydrogen sulfide, unexpectedly enhances the catalytic activity and utility of the crystalline metal aluminosilicate zeolites.

In one embodiment, the present invention provides a method for effecting transformation of organic compounds, catalytically convertible in the presence of acidic catalyst sites, by contacting the same under conversion conditions with a catalyst of a crystalline metal aluminosilicate having rigid three-dimensional networks made up of unit cells characterized by the substantial absence of change in unit cell dimensions upon dehydration and rehydration and a homogeneous pore structure made up of highly uniform interstitial dimensions, which catalyst has undergone contact prior to completion of said transformation reaction with a sufficient amount of an acidic gas having a dissociation constant, expressed as the negative logarithm of the first dissociation equilibrium constant of greater than 6 but less than 10, to effectively enhance the activity of such catalyst.

In another embodiment, the invention affords a method for cracking a hydrocarbon charge in the presence of the aforementioned acidic gas and the above crystalline metal aluminosilicate catalyst.

In a further embodiment, the invention resides in a method for effecting disproportionation of a hydrocarbon charge in the presence of the above acidic gas and crystalline aluminosilicate catalyst.

In still another embodiment, the invention resides in a method for converting organic compounds, catalytically convertible in the presence of acidic catalyst sites, by contacting the same with a crystalline metal aluminosilicate having a uniform structure made up of pores incapable of affording entry into the interior of the aluminosilicate of the organic compound charge, which aluminosilicate has undergone contact prior to conversion of said charge with a sufficient amount of the above acidic gas to effectively enhance the activity thereof.

The metal aluminosilicates employed as catalysts in the process of this invention are essentially dehydrated forms of crystalline siliceous zeolites, containing varying quantities of alkali metal, alkaline earth metal and aluminum with or without other metals. All or a portion of the alkali metal and alkaline earth metal ions normally contained in the zeolitic structure may be replaced with a number of other ions. The atoms of alkali metal, alkaline earth metal or metals in replacement thereof, silicon, aluminum and oxygen are arranged in a definite and consistent crystalline pattern. Such structure contains a large number of small cavities, interconnected by a number of still smaller channels. These cavities and channels are precisely uniform in size. The interstitial dimensions of openings in the crystal lattice limit the size and shape of the molecules that can enter the interior of the aluminosilicate and it is such characteristic of many crystalline zeolites that has led to their designation as "molecular sieves."

Zeolites having the above charcteristics include both natural and synthetic materials, for example, chabazite, gmelinite, mesolite, ptiliolite, mordenite, natrolite, nepheline, sodalite, scapolite, lazurite, leucrite and cancrinite. Synthetic zeolites may be of the A type, X type, Y type, T type or other well known form of molecular sieve, including ZK zeolites such as those described in copending application Serial No. 134,841 filed August 30, 1961. Preparation of the above type zeolites is well known, having bene described in the literature, for example A type zeolite in U.S. 2,882,243; X type zeolite in U.S. 2,882,244; Y type zeolite in Belgium Patent No. 577,642 and T type zeolite in U.S. 2,950,952. As initially prepared, the metal of the aluminosilicate is an alkali metal and usually sodium. Such alkali metal is subject to base-exchange with a wide variety of other metal ions. The molecular sieve materials so obtained are unusually porous, the pores having highly uniform molecular dimensions, generally between about 3 and about 15 Angstrom units in diameter. Each crystal of molecular sieve material contains literally billions of tiny cavities or cages interconnected by channels of unvarying diameter. The size, valence and portion of the metal ions in the crystal control the effective diameter of the interconnecting channels.

At the present time, there are commercially available molecular sieves of the "A" series and of the "X" series. A synthetic zeolite known as "Molecular Sieve 4A" is a crystalline sodium aluminosilicate having channels of about 4 Angstroms in diameter. In the hydrated form, this material is chemically characterized by the formula: $Na_{12}(AlO_2)_{12}(SiO_2)_{12}.27 H_2O$. The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium for two sodium ions. A crystalline sodium aluminosilicate having pores approximately 10 Angstroms in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula:

$$Na_{86}[(AlO_2)_{86}(SiO_2)_{106}].267H_2O$$

The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 Angstroms in diameter and in which a substantial proportion of the sodium ions of the 13X material have been replaced by calcium.

Molecular sieves of the "X" series are characterized by the formula:

$$M_{\frac{86}{n}}[(AlO_2)_{86}(SiO_2)_{106}].267H_2O$$

where M is $Na^+$, $Ca^{++}$ or other metal ions introduced by replacement thereof and $n$ is the valence of the cation M. The structure consists of a complex assembly of 192 tetrahedra in a large cubic unit cell 24.95 A. on an edge. Both X and Y type crystalline aluminosilicates have essentially identical crystal structures. They differ from each other in chemical composition with type Y aluminosilicate having a higher $SiO_2/Al_2O_3$ ratio than the X type aluminosilicate.

The alkali metal generally contained in the naturally occurring or synthetically prepared zeolites described above may be replaced partially or completely by other metal ions, Suitable replacing ions include other alkali metals, for example sodium may be replaced with lithium or potassium; alkaline earth metals such as calcium, strontium and magnesium, as well as various other ions such as those of cobalt, zinc, silver, nickel, copper, chromium, iron, zirconium, thorium, beryllium, manganese, palladium, tin, rhenium, aluminum, gold, platinum, cadmium, mercury, lanthanum, cerium and other rare earth metals. Replacement is suitably accomplished by contacting the initially formed crystalline aluminosilicate with a solution of an ionizable compound of the metal ion which is to be zeolitically introduced into the molecular sieve structure for a sufficient time to bring about the extent of desired introduction of such ion. After such treatment, the ion-exchanged product is water washed, dried and calcined. The extent to which exchange takes place can be controlled. It is essential that the aluminosilicate undergoing activation in accordance with the present invention be a metal-containing aluminosilicate. Aluminosilicates in which all of the initial alkali metal is replaced by hydrogen or ammonium ions do not respond to activation with the acidic gases described herein. While the metal aluminosilicate employed may have been treated to effect a partial replacement of the metal ions with hydrogen or ammonium ions, it is essential that the aluminosilicate undergoing activation contain at least some metal cations. Such materials are designated herein as metal aluminosilicates.

The metal aluminosilicate may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline metal aluminosilicate. Such materials may be catalytically inert or may possess an intrinsic catalytic activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxide with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Serial No. 147,722 filed October 26, 1961 by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be base-exchanged to introduce selected metal ions into the aluminosilicate and then dried and calcined.

The inorganic oxide gel employed, as described above, as a matrix for the metal aluminosilicate may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl ortho silicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the present process is preferably used in the form of small fragments of a size best suited for operation under the specific conditions existing. Thus, the catalyst may be in the form of a finely divided powder or may be in the form of pellets of 1/16" or 1/8" size, for example, obtained upon pelleting the crystalline aluminosilicate with a suitable binder such as clay, colloidal graphite, etc. Likewise, the metal aluminosilicate dispersed in a gel matrix or supported on a suitable porous support of the type described above may be utilized in any desired physical form. For example, hydrogel containing added crystalline metal aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powdered metal aluminosilicate in a hydrosol and introducing globules of the resulting hydrosol into a body of water-immiscible liquid, for example an oil medium, wherein the globules of hydrosol set to a hydrogel and subsequently pass into an underlying layer of water from which they are sluiced to further processing operations such as base-exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spheroidally shaped particles is of particular advantage in hydrocarbon conversion processes in which the catalyst is subjected to continuous movement, such as the compact moving bed process, the fluidized process, etc. As applied to the stationary bed, spheroidal catalyst particles provide effective contact between the reactants and the catalyst by avoiding channeling.

While, for the production of spheroidal catalyst particles by the aforementioned technique, initial formation of a hydrosol which sets upon lapse of a short interval of time to an all-embracing bead-form hydrogel is essential, it is also feasible to employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two. Also, the matrix may consist of or contain, as a component thereof, a clay and particularly a clay of the montmorillonite or kaolinite families, either raw or acid treated. Other suitable materials for use as the matrix of the present catalyst composition include charcoal, graphite, bauxite and other binders compatible with the crystalline metal aluminosilicate and thermally stable under the temperature conditions at which the catalyst is used.

The acidic gas utilized in the present process for activating the above described metal aluminosilicate catalysts is one essentially characterized by a dissociation constant, expressed as the negative logarithm of the first dissociation equilibrium constant, i.e. $-\log K$, of greater than 6 but less than 10. It is also within the purview of the invention to employ a material which undergoes decomposition at the temperature of contact with the catalyst to such specified acidic gas. Suitable representative acidic gases include hydrogen cyanide, hydrogen sulfide, methyl mercaptan, hydrogen telluride and hydrogen selenide. Acidic gases having a dissociation constant, expressed as $-\log K$ of less than 6, are not feasible for use in the present process since such strong acidic gases upon contact with the crystalline aluminosilicate result in destruction of the crystalline structure. Thus, attempts to activate the metal aluminosilicates described herein with hydrogen bromide resulted in destruction of the crystal aluminosilicate structure, causing a very substantial reduction in catalytic activity.

Contact of the metal aluminosilicate catalyst with the aforementioned acidic gas may be conducted as a pretreating step before bringing the catalyst into contact with the organic charge. Alternatively, the acidic activating gas may be introduced simultaneously with the charge gas to contact with the crystalline aluminosilicate catalyst or the acidic gas may be introduced into the reaction zone after contact between the charge stream and the aluminosilicate catalyst has been carried out for a predetermined interval of time. Also, in some instances, it may be desirable to periodically introduce the acidic gas into the reaction zone while the charge gas is fed continuously thereto. The aluminosilicate catalyst may also be given a periodic treatment with the acidic gas while out of contact with the charge gas, for example after periodic regeneration of the catalyst, but prior to placing the regenerated catalyst on stream. It will be understood that the various above means for contacting the catalyst and acidic activating gas do not necessarily afford equivalent or comparable results. It is, however, essential that contact between the catalyst and acidic gas be made prior to substantial completion of the conversion reaction under consideration.

The amount of acidic gas utilized in any instance is sufficient to effectively enhance the activity of the aluminosilicate catalyst. The particular amount of acidic gas required to attain the desired promoting effect will vary depending on the specific catalyst employed, the nature of the catalytic process involved and the particular acidic gas utilized for activation. Generally, however, the acidic activating gas will be brought into contact with the catalyst in an amount corresponding to between about 0.05 and about 25 percent by weight based on the catalyst or with a flowing gas of larger total volume. In continuous operations, a rate of feed of acidic gas of about 1 percent to about 200 percent by weight per hour based on the catalyst will generally be employed, although in some instances amounts as small as 0.1 weight percent per hour may be used. Generally, the catalyst to charge stock volume ratio employed in carrying out the reactions contemplated by the present invention is within the approximate range of 0.02 to 10. The partial pressure of acidic activating gas in the reaction zone is generally within the range of about .01 to about 10 atmospheres. Although a continuous feed of acidic gas has been found to be most effective, particularly in continuous process operations, there are reactions in which a transient acidic gas contact produces a fairly long period of activation. In such cases, it is feasible to treat the catalyst intermittently with the acidic gas rather than with a continuous stream. In processes operated on a batch basis the supply of acidic gas may consist of part of the charge.

While the acidic gas employed will generally be contacted, as such, directly with the catalyst either in the absence or presence of the charge stock, it is contemplated that such gas may alos be produced in situ during the course of the catalytic reaction. The use of an acidic gas as an activator for the catalyst has the further advantage of emerging from the reaction zone along with the products and being capable of easy separation therefrom. Thus, the acidic activating gas emerging with any gaseous products may be removed, for example, by contacting the gases with a suitable sorbent such as a solution of caustic soda or soda ash. The presence of acidic activating gas employed in any liquid products is usually negligible since the solubility thereof in most liquid products is sufficiently small so as not to be troublesome. If desired or necessary, however, liquid product may be substantially freed of acidic gas by heating or by washing the product with a suitable sorbent therefore such as a solution of caustic soda. Also, the acidic activator being a gas at temperatures at which the reactant and the major portion of products are liquid, can be recovered in a gas-liquid separation zone, and be recycled periodically or continuously over the catalyst bed. Such operation is particularly economical in requiring only small amounts of the acidic gaseous activator to support the operation.

Although the effectiveness of activation of the crystalline metal aluminosilicate catalyst with an acidic gas, as described herein, has been observed with different ionic forms of the above-described crystalline aluminosilicates, the greatest increase in activation has been observed with the alkali and alkaline earth aluminosilicate salts. A very marked effect of acidic gas as an activator has been realized with alkali metal and alkaline erth metal crystalline aluminosilicates having uniform pore openings in the range 5 to 15 Angstroms. It has been established that after contact with an acidic gas, as described herein, such materials are activated to a level of catalytic effectiveness which is greatly above that achieved with the use of the untreated catalyst. Thus, it has been found that the catalytic activities of the crystalline metal aluminosilicate catalysts which have undergone treatment with an acidic gas, as described herein, possess catalytic activities up to almost fifty times the activities of the same catalysts which have not been so treated. For certain of the crystalline aluminosilicates, particularly those composed of networks of sodalite units, including, for example, X-type sodium aluminosilicate and sodalite, it has been observed that the catalyst retains increased activity after being subjected to treatment with the acidic gas and subsequently removed from contact with such gas. For these aluminosilicates, initial contacting with acidic gas may be followed by operation without continuous acidic gas treatment. For example, the acidic gas contact can be practiced as a pretreating operation or as a periodic treatment. The latter method of operation is particularly applicable as part of a cyclic operation, i.e. after regeneration of the catalyst and prior to catalytic conversion.

It has further been found that crystalline metal aluminosilicates which are essentially inactive for catalyzing reactions in the presence of acidic catalyst sites by reason of their small uniform pore structure incapable of penetration by the organic charge may be rendered catalytically active by treatment with an acidic gas as described herein. Thus, following the teachings of this invention, it is possible to convert essentially inactive metal aluminosilicates having uniform pore openings of not greater than about 4 Angstroms in diameter to catalytically active materials by treatment with an acidic gas as described hereinabove. In such manner, sodalite, A-type sodium aluminosilicate, and A-type potassium aluminosilicate having pores incapable of penetration by the organic charge may be transformed into useful catalysts by the acidic gas activation technique of the instant invention.

As will be evident from data hereinafter set forth, treatment of silica-alumina gel conversion catalysts with an acidic gas of the type described herein afforded only a minor improvement in activity when compared with that achieved upon treatment of the crystalline metal aluminosilicates. Likewise, activation of clay hydrocarbon conversion catalysts with an acidic gas such as described herein results in only comparatively minor improvement in activity as contrasted with the very marked improvement realized upon acidic gas activation of the crystalline metal aluminosilicates.

The reactions promoted by acidic activating gas with the crystalline aluminosilicate zeolites described herein involve conversion of certain classes of organic compounds, including cracking of paraffinic, olefinic, aromatic and naphthenic hydrocarbons as well as mixtures thereof, for example petroleum fractions, such as those boiling in the gas oil range; disproportionation of aromatics; dehydration of alcohols to olefins and ethers; hydration of olefins to alcohols; isomerization and polymerization of olefins; isomerization of terpenes; alkylation and dealkylation of aromatic hydrocarbons.

The cracking of hydrocarbons, and particularly normal hydrocarbons having a carbon chain of from 5 to 30 carbon atoms, represents an especially advantageous use of the acidic gas activated crystalline metal aluminosilicate catalysts since the nature of the products may be well controlled. The catalyst in such process may be used as pellets in a fixed bed operation or they may be used in a compact moving bed operation or in a fluidized operation. The general operating conditions cover a wide range because of the wide utility of the catalysts. In cracking paraffins for the production of olefins, it is generally desirable to carry out such process at atmospheric pressure, employing a temperature in the approximate range of 700 to 1200° F. and preferably 800 to 1000° F. The liquid hourly space velocity of the charge may range from 0.2 to 40, preferably from 0.5 to 20. The normal paraffins that may be charged range from $C_5$ to $C_{30}$ paraffins and mixtures thereof. Generally, the conversion of charge improves with increasing molecular weight, so that for hexane cracking, for example, the low ranges of space velocity and higher temperatures are desirable for satisfactory conversion. The cracking of other crackable hydrocarbons including aromatics containing alkyl chains, naphthenes and olefins is likewise advantageously carried out with the hereinabove-described-catalysts which have undergone treatment with the specified acidic gases.

Catalytic cracking with the acidic gas activated crystalline metal aluminosilicate catalysts described herein may be carried out by contacting a crackable hydrocarbon charge at catalytic cracking conditions employing a temperature within the approximate range of 550 to 1100° F. and under a pressure ranging from subatmospheric pressure up to several hundred atmospheres. The contact time of the hydrocarbon charge with the catalyst is adjusted in any case according to the conditions, the particular charge stock and the particular results desired to give a substantial amount of cracking to lower boiling products.

Thus, as illustrative of the usefulness of this invention, it has been established that paraffinic hydrocarbons may be cracked over the acidic gas activated crystalline metal aluminosilicate catalysts to afford a high yield of olefins. The latter are particularly desirable products since they are susceptible to a wide variety of useful applications. They may be employed, for example, in the formation of high octane alkylate; they also may be used for alkylation of benzene to form cumene and other alkyl benzenes; or they may be polymerized to liquid fuels or to form plastics such as polyethylene and polypropylene. In many instances, these desirable olefin products may be formed in high yields by cracking low-valued petroleum charge stocks, such as paraffinic materials in the $C_6$—$C_{10}$ range.

Disproportionation of aromatic hydrocarbons utilizing the acidic gas activated crystalline metal aluminosilicate catalysts described herein is carried out by contacting a charge of an alkyl aromatic at a temperature of between about 600 and about 1100° F. Under such conditions, for example, toluene is effectively converted into benzene and xylenes.

Dehydration of alcohols utilizing the acidic gas activated crystalline metal aluminosilicate catalyst described herein is carried out by contacting a charge of either normal or isoalcohols at a temperature of between about 200° F. and about 650° F. Normal alcohols can, under such conditions, be effectively dehydrated to ethers, while isoalcohols are ordinarily dehydrated to olefins.

Isomerization of olefins utilizing the acidic gas activated crystalline metal aluminosilicate catalyst described herein is generally carried out at a temperature of between about 30° F. and about 900° F.

In addition to cracking, dehydration and disproportionation, it is contemplated that acidic gas activation may be used with the above-described crystalline aluminosilicate catalysts in various other reactions in which organic compounds undergo chemical conversion or transformation into useful products in the presence of acidic catalyic sites. Thus, the isomerization of cycloolefins, such as terpenes, and alkylcyclopentanes; the polymerization of olefins and vinylaromatic compounds and the alkylation and dealkylation of aromatics are all reactions which normally are catalyzed by acidic catalysts. The promotion of such reactions over the crystalline metal aluminosilicate catalysts referred to herein is thus logically to be included within the scope of the present invention.

The following examples will serve to illustrate the method and scope of the present invention without limiting the same:

EXAMPLE 1

A steam stabilized rare earth aluminosilicate was prepared by contacting sodium X-type crystalline aluminosilicate, known commercially as Molecular Sieve 13X, with an excess of a 5 weight percent aqueous solution of rare earth metal chloride having the following composition, expressed as oxides:

| | Weight percent |
|---|---|
| Cerium oxide ($CeO_2$) | 20 |
| Lanthanum oxide ($La_2O_3$) | 11 |
| Praseodymium oxide ($Pr_6O_{11}$) | 3 |
| Neodymium oxide ($Nd_2O_3$) | 9 |
| Samarium oxide ($Sm_2O_3$) | 1 |
| Gadolinium oxide ($Gd_2O_3$) | 0.3 |
| Other rare earth oxides | 0.1 |

The above contact was carried out for 48 hours at a temperature of 180° F. The aluminosilicate was then removed by filtration from the contacting solution and the filter cake washed with water at 180° F. until free of chloride. The washed product was dried at 230° F. in air for 20 hours and thereafter calcined in air at 1000° F. for 10 hours. The rare earth aluminosilicate, so obtained, was then stabilized by contacting with steam at a pressure of 15 p.s.i.g. for 30 hours and dried. The product, by analysis, contained 0.53 weight percent sodium and 28.9 weight percent of rare earth metal.

This material was employed as a catalyst in the cracking of n-hexane. A stream of helium was bubbled through liquid n-hexane to vaporize the charge, giving a vapor pressure of 153 mm. of n-hexane in the charge stream. Contact of the catalyst and charge was carried out at atmospheric pressure, utilizing a residence time of 18 seconds in a small heated reactor zone containing 3 cc. of catalyst at 850–1000° F. Cracking was initially carried out in the absence of hydrogen sufide and thereafter in the presence of added hydrogen sulfide by introducing a quantity of the latter gas into the charge stream in a gaseous volume ratio, corresponding to 2:8 of $H_2S$:charge gas. The effluent product stream was analyzed by vapor-chromatography. The results are shown below in Table I:

*Table I*

| Temperature, °F. | $H_2S$ Added | n-hexane Conversion, percent | Wt. percent product analysis | | | | | Increase (n-fold) In Activity By $H_2S$ Activation n |
|---|---|---|---|---|---|---|---|---|
| | | | $CH_4$ | $C_2H_6$ | $C_2H_4$ | $C_3H_8$ | $C_3H_6$ | |
| 850 | No | 23.4 | 1.7 | 1.0 | 0.2 | 6.3 | 5.8 | ~4 |
| | Yes | 64.1 | 6.8 | 3.8 | 0.2 | 23.0 | 9.6 | |
| 950 | No | 76.7 | 14.5 | 7.9 | 0.4 | 31.6 | 12.4 | ~3 |
| | Yes | 98.3 | 21.2 | 12.2 | 0.3 | 48.3 | 7.8 | |
| 1,000 | No | 88.5 | 19.8 | 11.0 | 0.6 | 37.4 | 13.3 | ~3 |
| | Yes | 99.8 | 23.8 | 15.3 | | 47.3 | 9.6 | |

It is evident from the foregoing data that $H_2S$ addition afforded a very marked increase in the extent of conversion. The data indicate not merely a percentage increase in activity, but an approximately three to four fold increase in activity. As is well known in the art, the conversion scale approximates a scale of per-unit-catalyst activity scale only at low conversion, since conversion approaches a constant of 100 percent for arbitrarily large per-unit- catalyst activities. The relationship between fractional conversion C and catalytic activity, i.e. the catalytic activity rate constant per unit quantity of catalyst $k$ is usually and conveniently based on a first order rate law and may be expressed as follows: $C = 1 - e^{-k\tau}$ wherein $\tau$ is the residence time. When catalytic activity is compared at a given residence time in the case of two comparative tests, this relationship results in the following relationship between the activity ratio and the observed fractional conversions in the two cases $C_1$ and $C_2$:

$$n = \frac{k_2}{k_1} = \log \frac{1}{1-C_2} \Big/ \log \frac{1}{1-C_1}$$

In this manner, the increase of activity between the $H_2S$-activated conversion and that carried out in the absence of $H_2S$ can be conveniently noted regardless of the conversion level.

EXAMPLES 2–5

Cracking of n-hexane was carried out as in Example 1 over various siliceous catalysts in the presence and absence of hydrogen sulfide. The results obtained are set forth in Table II below:

It will be evident from the data in the above table that activation of the catalyst with hydrogen sulfide af-

*Table II*

| Example | Catalyst | Temperature, °F. | H₂S Added | n-hexane Conversion, percent | Increase in Activity n |
|---|---|---|---|---|---|
| 2 | Silica-alumina Cogel [1] | 935 | No / Yes | 7.6 / 22.9 | ~3 |
| 3 | 13X, Na-aluminosilicate | 1,000 | No / Yes | 31.6 / 97.3 | ~10 |
| 4 | 10X, Ca-aluminosilicate | 935 | No / Yes | 25.3 / 75.7 | ~5 |
| 5 | 5A Ca-aluminosilicate | 935 | No / Yes | 3.5 / 61.5 | ~25 |
|   |   | 1,000 | No / Yes | 6.1 / 92.1 | ~45 |

[1] Cogelled composite of silica and alumina containing 90 weight percent SiO₂ and 10 weight percent Al₂O₃.

It will be seen from the above data that very substantial activation effects are attained in the presence of hydrogen sulfide for various crystalline metal aluminosilicate cracking catalysts. It will further be evident that such activating effect with the crystalline aluminosilicate catalysts was much greater than that achieved upon comparable treatment of a silica-alumina cogel. A particularly marked effect is observed upon activation of the 5A aluminosilicate with hydrogen sulfide. This effect is of considerable interest and application in connection with size selective catalysis, such as, for example in the selective cracking of n-paraffins from a stream containing the same admixed with cyclic hydrocarbons of the type described in U.S. 2,950,240.

EXAMPLE 6

The catalyst described in Example 1 was employed for the disproportionation of toluene into benzene and xylenes. A stream of helium was bubbled through toluene to vaporize the charge, giving a vapor pressure of 37 mm. of toluene in the charge stream. Contact of the catalyst and charge was carried out at atmospheric pressure, utilizing a residence time of 3 seconds in a heated reaction zone containing 3 cc. of catalyst at 800° F. The disproportionation was initially carried out in the absence of hydrogen sulfide and thereafter in the presence of added hydrogen sulfide by introducing a quantity of the latter into the charge stream in a gaseous volume ratio corresponding to 2:8 of H₂S to charge gas. The effluent product stream was analyzed for toluene conversion, $C_1$ to $C_6$ aliphatics, benzene and $C_8^+$ aromatics. The results are hereinafter shown below in Table III.

EXAMPLE 7

Disproportionation of toluene into benzene and xylenes was carried out as in Example 6 except that the catalyst employed was 13X sodium aluminosilicate. Contact was initially carried out at a temperature of 1000° F. in the absence of hydrogen sulfide and thereafter in the presence of the catalyst which had undergone pretreatment with H₂S for 5 hours at 800° F. and then contacted with the charge gas without a concurrent stream of hydrogen sulfide. The effluent product stream was analyzed as in Example 6 and the results obtained together with those for the latter example are set forth below:

forded a distinct improvement in the yield of disproportionation of toluene into benzene and xylenes.

EXAMPLE 8

N-hexane was cracked at a temperature of 1000° F. as is Example 1 but utilizing as catalyst 5A calcium aluminosilicate. The extent of n-hexane conversion was determined before addition of hydrogen sulfide, during the addition of hydrogen sulfide and after addition of hydrogen sulfide. The results obtained are shown in Table IV below:

*Table IV*

Time:              n-Hexane conversion, percent
  Before H₂S contact _______________________ 7.5
  During H₂S contact _________________ 94.7 to 95.0
  10 minutes after H₂S contact _______________ 25.7

The permanence of the hydrogen sulfide activation effect is evident.

EXAMPLE 9

The permanent effect of hydrogen sulfide activation is further exhibited by 13X sodium aluminosilicate. After contacting this material, as in Example 1 with the H₂S containing n-hexane charge stream, at 1000° F., for approximately 30 minutes, the n-hexane conversion had increased from a level of about 30 percent in the absence of hydrogen sulfide to about 98 percent in the presence of hydrogen sulfide. Thereafter, operating with the catalyst at 950° F. with no hydrogen sulfide added to the charge stream resulted in a conversion of between 81 and 86 percent for a test period of nearly three hours.

The effect of hydrogen sulfide activation is outstanding compared to the effect of other gases as will be evident from the following examples:

EXAMPLE 10

An investigation of n-hexane cracking was carried out in the absence of gaseous additive and in the presence of H₂S, CO₂ and air, all compared, under operating conditions identical with those described in the preceding examples, in a single series of comparison experiments, utilizing as catalyst a rare earth metal aluminosilicate contained in a silica-alumina gel matrix prepared by forming a hydrosol containing, on a solids basis, 94 weight per-

*Table III*

| Example | Catalyst | Temperature, °F. | H₂S | Toluene Conversion | Wt. percent products | | |
|---|---|---|---|---|---|---|---|
|   |   |   |   |   | $C_1$–$C_6$ Aliphatics | Benzene | $C_8^+$ Aromatics |
| 6 | Rare earth aluminosilicate | 800 | No / Yes | 15.9 / 24.9 | 4.5 | 7.2 / 10.1 | 8.7 / 9.6 |
| 7 | Na-aluminosilicate (13X) / Na-aluminosilicate (H₂S pretreated) | 1,000 | No / Yes | 1.3 / 2.9 | 0.1 | 0.4 / 1.3 | 0.9 / 1.5 | cent silica and 6 weight percent alumina at a pH of 8.5 and adding thereto 25 weight percent of sodium X-type crystalline aluminosilicate. The hydrogel obtained upon setting of the above hydrosol was base exchanged at room temperature with an aqueous solution of 2 weight percent rare earth metal chloride having the composition specified in Example 1. Base exchange involved contacting the hydrogel with excess of the rare earth metal chloride solution for a total of 13—2 hour contacts and 4 contacts of approximately 18 hours each. The resulting product was water washed free of chloride, dried for 20 hours in air at 235° F. and thereafter calcined in air for 10 hours at 1000° F.

Figure 1:
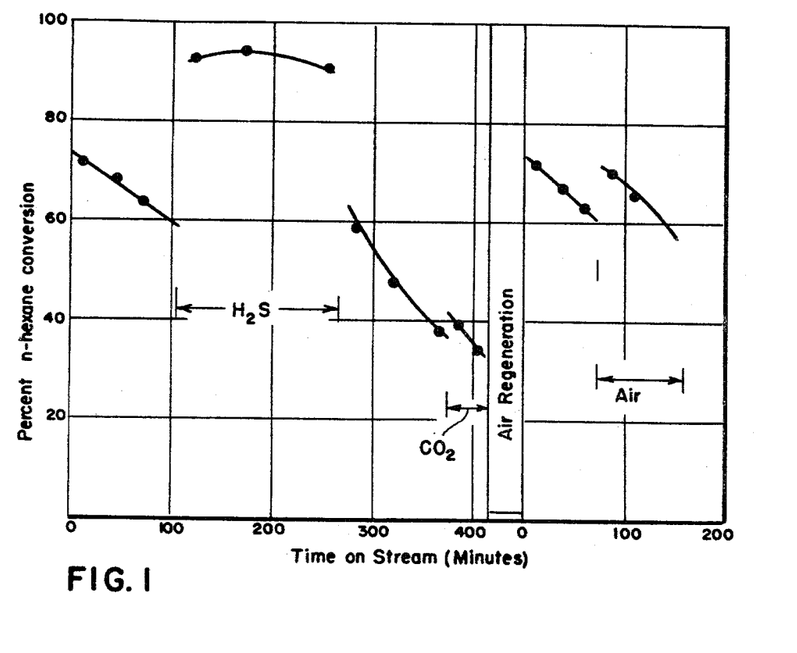

The results obtained are shown in FIGURE 1 wherein the extent of n-hexane conversion is plotted against time on stream in minutes. Referring more particularly to this figure, it will be seen that in the absence of any gaseous additive, the conversion of n-hexane decreased rapidly from about 74 to about 60 percent during the first 100 minutes on stream. Thereafter, upon the addition of hydrogen sulfide in an amount corresponding to a gaseous volume ratio of $H_2S$:charge gas of 5:4, n-hexane conversion rose to over 90 percent during the on stream period of about 100 to about 270 minutes. When addition of hydrogen sulfide was stopped, the percent n-hexane conversion dropped to about 64 and thereafter declined during the period of about 270 to about 350 minutes on stream to approximately 36. Upon addition of gaseous carbon dioxide in an amount corresponding to a gaseous volume ratio of $CO_2$:charge gas 5:4, the conversion rose to about 42 but thereafter declined during the period of $CO_2$ addition from about 350 to 420 minutes on stream to about 33 percent conversion. After regenerating the catalyst with air at a temperature of about 1000° F., conversion of n-hexane was again carried out in the absence of any gaseous additive for about 75 minutes. Upon introducing air in an amount corresponding to a gaseous volume ratio of air:charge gas of 5:4, into the charge stream during the period of 75 to 160 minutes on stream, the percent conversion rose initially to about 72 and thereafter rapidly declined to approximately 56. It will be apparent that while some initial activating effect is exhibited by $CO_2$ as well as by air, such effects are small and are not retained in comparison with the activation effect achieved with hydrogen sulfide.

EXAMPLE 11

This example illustrates the use of hydrogen cyanide as the activating gas.

1.5 cc. of X-type sodium aluminosilicate were subjected to a flow of 2 cc./minute of hydrogen cyanide and 8 cc./minute of helium for a period of four hours at 700° F.

The resulting treated material was employed as a catalyst in the cracking of n-hexane. A stream of helium was bubbled through liquid n-hexane to vaporize the charge, giving a vapor pressure of 153 mm. of n-hexane in the charge stream. Contact of the catalyst and charge was carried out at atmospheric pressure utilizing a residence time of 9 seconds in a heated reactor containing 1.5 cc. of catalyst at 1000° F. Cracking of the n-hexane stream was also carried out under identical conditions with the untreated sodium aluminosilicate. The results obtained are shown below:

| | Time on Stream (Min.) | Temp., °F. | n-hexane Conversion, percent |
|---|---|---|---|
| Untreated Catalyst | 10 | 1,000 | 12.7 |
| HCN Treated Catalyst | 10 | 1,000 | 20.1 |

EXAMPLE 12

This example illustrates the use of hydrogen selenide as the activating gas.

1.5 cc. of X-type sodium aluminosilicate were subjected to a stream containing by volume approximately 50 percent hydrogen selenide and 50 percent hydrogen flowing at a rate of 5 cc./minute for a period of 2 hours at 700° F.

The resulting treated material was employed as a catalyst in the cracking of n-hexane under conditions identical with those described in the preceding example. The results obtained are shown below:

| | Time on Stream (Min.) | Temp., °F. | n-hexane Conversion, percent |
|---|---|---|---|
| Untreated Catalyst | 26 | 1,000 | 15.8 |
| $H_2Se$ Treated Catalyst | 26 | 1,000 | 99.9 |

As will be evident, treatment of the aluminosilicate with hydrogen selenide imparted a very marked increase in activity of the catalyst.

EXAMPLE 13

This example illustrates the use of methyl mercaptan as the activating gas.

A stream of helium was bubbled through liquid n-hexane to vaporize the charge, giving a vapor pressure of 153 mm. of n-hexane in the charge stream. The catalyst employed was X-type sodium aluminosilicate. Contact of the catalyst and charge was carried out at atmospheric pressure, utilizing a residence time of 9 seconds in a heated reactor zone containing 1.5 cc. of catalyst maintained at an approximate temperature of 1000° F.

Cracking was initially carried out in the absence of methyl mercaptan, then in the presence of added methyl mercaptan by introducing a quantity of the latter gas into the charge stream in a gaseous volume ratio, corresponding to 2:8 of methyl mercaptan:charge gas. Thereafter, the introduction of methyl mercaptan was stopped, the catalyst regenerated at 1000–1030° F. for 15 minutes in air and cracking continued in the absence of methyl mercaptan.

The data obtained are summarized in the following table:

| Time On Stream (Min.) | Temp., °F. | $CH_3SH$ On/Off | n-hexane Conversion, percent |
|---|---|---|---|
| 40 | 1,000 | Off | 10.8 |
| 72 | 1,000 | On | |
| 100 | 1,000 | On | 71.1 |
| 160 | 1,000 | On | 59.2 |
| 160 | 1,000 | Off | |
| 190 | 1,000 | Off | 58.2 |
| 250 | 1,000 | Off | 55.2 |
| 15 Min. Air Regeneration | 1,000–1,030 | | |
| 10 | 1,000 | Off | 38.8 |

It will be seen from the above data that methyl mercaptan is an effective activator. There is, in fact, continued activation after removal of the added mercaptan and continued activation even after regeneration of the catalyst.

EXAMPLE 14

Scapolite was employed in this example as a catalyst for the cracking of n-hexane.

A stream of helium was bubbled through liquid n-hexane to vaporize the charge giving a vapor pressure of 153 mm. of n-hexane in the charge stream. Contact of the catalyst and charge was carried out at atmospheric pressure utilizing a residence time of 9 seconds in a heated reactor zone containing 1.5 cc. of catalyst maintained at an approximate temperature of 1000° F.

Cracking with the fresh untreated catalyst afforded a n-hexane conversion of only 0.9 percent, while cracking with the catalyst treated with hydrogen sulfide for 63 minutes by introducing a quantity of the latter gas into the charge stream in a gaseous volume ratio corresponding to 2:8 of hydrogen sulfide:charge gas gave a n-hexane conversion of 19.3 percent.

EXAMPLE 15

Natural mordenite was employed in this example as a catalyst for the cracking of n-hexane.

Contact of the catalyst and charge was carried out as in the preceding example but utilizing a residence time of 1.8 seconds in a heated reactor zone containing 0.3 cc. of catalyst maintained at a temperature of 900–1000° F.

Cracking was initially carried out in the absence of hydrogen sulfide, then in the presence of added hydrogen sulfide by introducing a quantity of the latter gas into the charge stream in a gaseous volume ratio, corresponding to 2:8 of hydrogen sulfide:charge gas.

The data obtained are summarized in the following table:

| Time On Stream (Min.) | Temp., ° F. | H$_2$S on/off | n-hexane Conversion, Percent |
|---|---|---|---|
| 10 | 900 | Off | 0.1 |
| 32 | 1,000 | Off | 0.9 |
| 53 | 1,000 | Off | 0.9 |
| 63 | 900 | On | 5.0 |
| 86 | 900 | On | 5.0 |
| 107 | 900 | On | 5.0 |

As will be evident, a substantial activation of mordenite was obtained upon the addition of hydrogen sulfide.

EXAMPLE 16

3 cc. of synthetic zeolite ZK–4 described in copending application Serial No. 134,841 filed August 30, 1961, was employed as a catalyst in the cracking of n-hexane.

A stream of helium was bubbled through liquid n-hexane to vaporize the charge giving a vapor pressure of 153 mm. of n-hexane in the charge stream. Contact of the catalyst and charge was carried out at atmospheric pressure utilizing a residence time of 18 seconds in a heated reactor zone containing 3 cc. of catalyst maintained at an approximate temperature of 1000° F.

Cracking was initially carried out in the absence of hydrogen sulfide, then in the presence of added hydrogen sulfide by introducing a quantity of the latter gas into the charge stream in a gaseous volume ratio, corresponding to 2:8 of hydrogen sulfide:charge gas. Thereafter, the introduction of hydrogen sulfide was stopped with continued measurement of the extent of conversion.

The data obtained are summarized in the following table:

| Time On Stream (Min.) | Temp., ° F. | H$_2$S on/off | n-hexane Conversion, Percent |
|---|---|---|---|
| 10 | 1,000 | Off | 12.3 |
| 31 | 1,000 | Off | 14.0 |
| 62 | 1,000 | On | |
| 67 | 1,000 | On | 48.2 |
| 88 | 1,000 | On | 82.3 |
| 145 | 1,000 | Off | |
| 176 | 1,000 | Off | 21.4 |
| 201 | 1,000 | Off | 13.3 |

It will be noted that a marked increase in activity of the catalyst occurred during the addition of hydrogen sulfide and that the catalyst returned substantially to its previous activity level upon removal of hydrogen sulfide from the feed.

EXAMPLE 17

A sample of gmelinite, a naturally occurring mineral of the chabazite family, was tested for catalytic cracking activity in the absence and presence of hydrogen sulfide utilizing the technique described in the previous example.

The data obtained are summarized in the following table:

| Time On Stream (Min.) | Temp., ° F. | H$_2$S on/off | n-hexane Conversion, Percent |
|---|---|---|---|
| 10 | 1,000 | Off | 7.0 |
| 37 | 1,000 | Off | 2.5 |
| 65 | 950 | Off | 1.0 |
| 84 | 950 | On | |
| 94 | 950 | On | 24.9 |
| 137 | 1,000 | On | 43.1 |
| 160 | 1,000 | On | 42.5 |

As will be noted from the foregoing data, a very marked activation of the catalyst was achieved upon the addition of hydrogen sulfide.

The following Examples 18 and 19 will serve to illustrate activation of crystalline aluminosilicates having pore sizes sufficiently small to exclude the reactant charge from interior thereof. As regards such charge, the aluminosilicates may be considered to be essentially non-porous. It is accordingly feasible to convert crystalline aluminosilicates having no internally available crystal surfaces to useful catalysts by activation of the relatively small external crystal surface area utilizing techniques described herein. Such activation has been demonstrated with the A-type sodium aluminosilicate and with sodalite, each of which has crystalline pores incapable of penetration by the hydrocarbon charge.

EXAMPLE 18

A-type sodium aluminosilicate, known as molecular sieve 4A, is incapable of admitting n-hexane into its structure by reason of its small uniform pore size. It is accordingly characterized by negligible catalytic activity for cracking such hydrocarbons. After activation, utilizing the technique of the present invention, such crystalline aluminosilicate was found to have a surprisingly high cracking activity.

A stream of helium was bubbled through liquid n-hexane to vaporize the charge, giving a vapor pressure of 153 mm. of n-hexane in the charge stream. Contact of the catalyst and charge was carried out at atmospheric pressure, utilizing a residence time of 18 seconds in a heated reactor containing 3 cc. of catalyst at 1000° F. Cracking was initially carried out in the absence of hydrogen sulfide for about 69 minutes and thereafter in the presence of added hydrogen sulfide by introducing a quantity of the latter gas into the charge stream in a gaseous volume ratio corresponding to 2:8 of H$_2$S:charge gas during the period of about 69 to about 125 minutes on stream. Thereafter, the introduction of hydrogen sulfide was stopped while continuing measurement of the extent of conversion during the on-stream period of 125 to 188 minutes.

Figure 2:
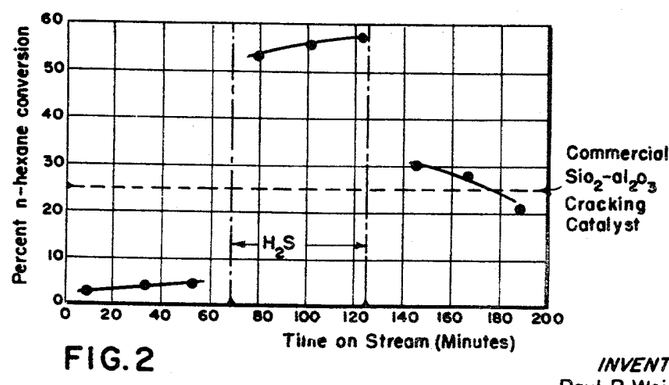

In FIGURE 2, there is shown activity results obtained upon cracking the n-hexane charge relative to a commercial silica-alumina gel cracking catalyst, before and after addition of hydrogen sulfide to the charge stream. It will be seen by reference to such figure that the addition of hydrogen sulfide imparted a high cracking activity to the 4A crystalline aluminosilicate.

EXAMPLE 19

Sodalite, a crystalline sodium aluminosilicate, is also incapable of admitting n-hexane into its structure by reason of its small uniform pore size and possesses only negligible catalytic activity for cracking such hydrocarbons.

After activation with hydrogen sulfide utilizing the technique described in the previous example, such crystalline aluminosilicate was found to have an unusually high cracking activity, which moreover remained after the addition of hydrogen sulfide to the charge stream had ceased.

The data obtained are summarized in the following table:

| Time On Stream (Min.) | H₂S On/Off | n-Hexane Conversion, percent |
|---|---|---|
| 10 | Off | <1.0 |
| 32 | Off | <1.0 |
| 52 | Off | <1.0 |
| 59 | On | |
| 79 | On | 38.2 |
| 102 | On | 39.8 |
| 122 | Off | |
| 144 | Off | 40.6 |
| 165 | Off | 37.0 |
| 188 | Off | 37.2 |
| 208 | Off | 35.6 |

The very marked increase in catalytic activity of the hydrogen sulfide-treated sodalite, as determined by the extent of n-hexane conversion, is evident from the foregoing data.

It is to be understood that the above description is merely illustrative of preferred embodiments of the invention of which many variations may be made by those skilled in the art without departing from the spirit thereof.

We claim:

1. A method for effecting transformation of organic compounds, catalytically convertible in the presence of acidic catalyst sites, which comprises contacting the same under conversion conditions with a catalyst of a crystalline metal aluminosilicate which has undergone contact prior to completion of said transformation with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

2. The method of claim 1 wherein the acidic gas is hydrogen sulfide.

3. The method of claim 1 wherein the acidic gas is methyl mercaptan.

4. The method of claim 1 wherein the acidic gas is hydrogen selenide.

5. A method for effecting transformation of organic compounds, catalytically convertible in the presence of acidic catalyst sites, which comprises contacting the same under conversion conditions with a catalyst consisting essentially of a crystalline metal aluminosilicate in finely divided form and a binder therefor, which catalyst has undergone contact prior to completion of said transformation with an acidic gas selected from the group consisting of hydrogen sulfide, methyl mercaptan and hydrogen selenide present in an amount sufficient to effectively enhance the activity of said catalyst, the aluminosilicate of which has rigid three-dimensional networks made up of unit cells characterized by the substantial absence of change in unit cell dimensions upon dehydration and rehydration and a uniform pore structure.

6. A method for effecting transformation of organic compounds, catalytically convertible in the presence of acidic catalyst sites, which comprises contacting the same under conversion conditions with a catalyst consisting essentially of a crystalline metal aluminosilicate contained in an inorganic oxide gel matrix, which catalyst has undergone contact prior to completion of said transformation with an acidic gas selected from the group consisting of hydrogen sulfide, methyl mercaptan and hydrogen selenide present in an amount sufficient to effectively enhance the activity of said catalyst, the aluminosilicate component of which has rigid three-dimensional networks made up of unit cells characterized by the substantial absence of change in unit cell dimensions upon dehydration and a uniform pore structure.

7. A method for effecting transformation of organic compounds, catalytically convertible in the presence of acidic catalyst sites, which comprises contacting the same under conversion conditions with a catalyst of a crystalline aluminosilicate composed of networks of sodalite units, which catalyst has undergone contact prior to completion of said transformation with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

8. A method for cracking a hydrocarbon charge which comprises contacting the same under catalytic cracking conditions with a catalyst of a crystalline metal aluminosilicate which has undergone contact proir to completion of said cracking with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

9. The method of claim 8 wherein the acidic gas is hydrogen sulfide.

10. The method of claim 8 wherein the acidic gas is methyl mercaptan.

11. The method of claim 8 wherein the acidic gas is hydrogen selenide.

12. A method for cracking a normally paraffinic hydrocarbon, having a carbon chain of from 5 to 30 carbon atoms, which comprises contacting the same under catalytic cracking conditions with a catalyst of a crystalline metal aluminosilicate which has undergone contact prior to completion of said cracking with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

13. A method for effecting disproportionation of aromatic compounds which comprises contacting the same under conversion conditions with a catalyst of a crystalline metal aluminosilicate which has undergone contact prior to completion of said disproportionation with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

14. A method for effecting disproportionation of toluene to benzene and xylenes which comprises contacting toluene at a temperature between about 600° F. and about 1100° F. with a catalyst of a crystalline metal aluminosilicate which has undergone contact prior to completion of said disproportionation with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

15. The method of claim 13 wherein the acidic gas is hydrogen sulfide.

16. A method for effecting transformation of organic compounds, catalytically convertible in the presence of acidic catalyst sites, which comprises contacting the same under conversion conditions with a catalyst selected from crystalline alkali metal, alkaline earth metal and rare earth metal aluminosilicates, which catalyst has undergone contact prior to completion of said transformation with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

17. A method for effecting transformation of organic compounds, catalytically convertible in the presence of acidic catalyst sites, which comprises contacting the same under conversion conditions with a catalyst of a crystalline metal aluminosilicate selected from the group consisting of A-type zeolites, X-type zeolites, Y-type zeolites, T-type zeolites, ZK-type zeolites, gmelinite, scapolite, mordenite and sodalite, which catalyst has undergone contact prior to completion of said transformation with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

18. A method for effecting transformation of organic compounds, catalytically convertible in the presence of acidic catalyst sites, which comprises contacting the same under conversion conditions with a catalyst of a crystalline metal aluminosilicate having pores normally incapable of penetration by said organic compounds, which catalyst has undergone contact prior to completion of said transformation with an acidic gas selected from the group consisting of hydrogen sulfide, methyl mercaptan and hydrogen selenide present in an amount sufficient to effectively enhance the activity of said catalyst, which catalyst has rigid three-dimensoinal networks made up of unit cells characterized by the substantial absence of change in unit cell dimensions upon dehydration and rehydration and a uniform pore structure made up of pores of between about 3 and about 5 Angstrom units in diameter.

19. A method for effecting transformation of organic compounds, catalytically convertible in the presence of acidic catalyst sites, which comprises contacting the same under conversion conditions with a catalyst of a crystalline metal aluminosilicate which has undergone pretreatment with an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

20. A method for effecting transformation of organic compounds, catalytically convertible in the presence of acidic catalyst sites, which comprises passing the same through a reaction zone containing a catalyst of a crystalline metal aluminosilicate, maintained under conversion conditions, introducing into and maintaining during transformation in said reaction zone an acidic gas selected from the group consisting of hydrogen sulfide, methyl mercaptan and hydrogen selenide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure.

References Cited in the file of this patent

UNITED STATES PATENTS

| | | |
|---|---|---|
| 2,227,671 | Pier et al. | Jan. 4, 1941 |
| 2,288,336 | Welty | June 30, 1942 |
| 2,971,904 | Gladrow et al. | Feb. 14, 1961 |
| 3,033,778 | Frilette | May 8, 1962 |

OTHER REFERENCES

Lange's Handbook of Chemistry, 1946, pages 1377 and 1379.

Notice of Adverse Decision in Interference

In Interference No. 95,160 involving Patent No. 3,173,855, J. N. Miale and P. B. Weisz, CATALYTIC CONVERSION WITH ACTIVATED CATALYST, final judgment adverse to the patentees was rendered Feb. 16, 1968, as to claims 2, 9, 12 and 16–20.

[*Official Gazette July 2, 1968.*]